Sept. 20, 1932.  L. H. LARSON  1,877,770

TRACTOR PROPELLED RAKE AND LOADER

Filed Feb. 24, 1931   5 Sheets-Sheet 1

INVENTOR
LOUIS H. LARSON
BY
ATTORNEY

Sept. 20, 1932. L. H. LARSON 1,877,770
TRACTOR PROPELLED RAKE AND LOADER
Filed Feb. 24, 1931 5 Sheets-Sheet 2

INVENTOR
LOUIS H. LARSON
BY
ATTORNEY

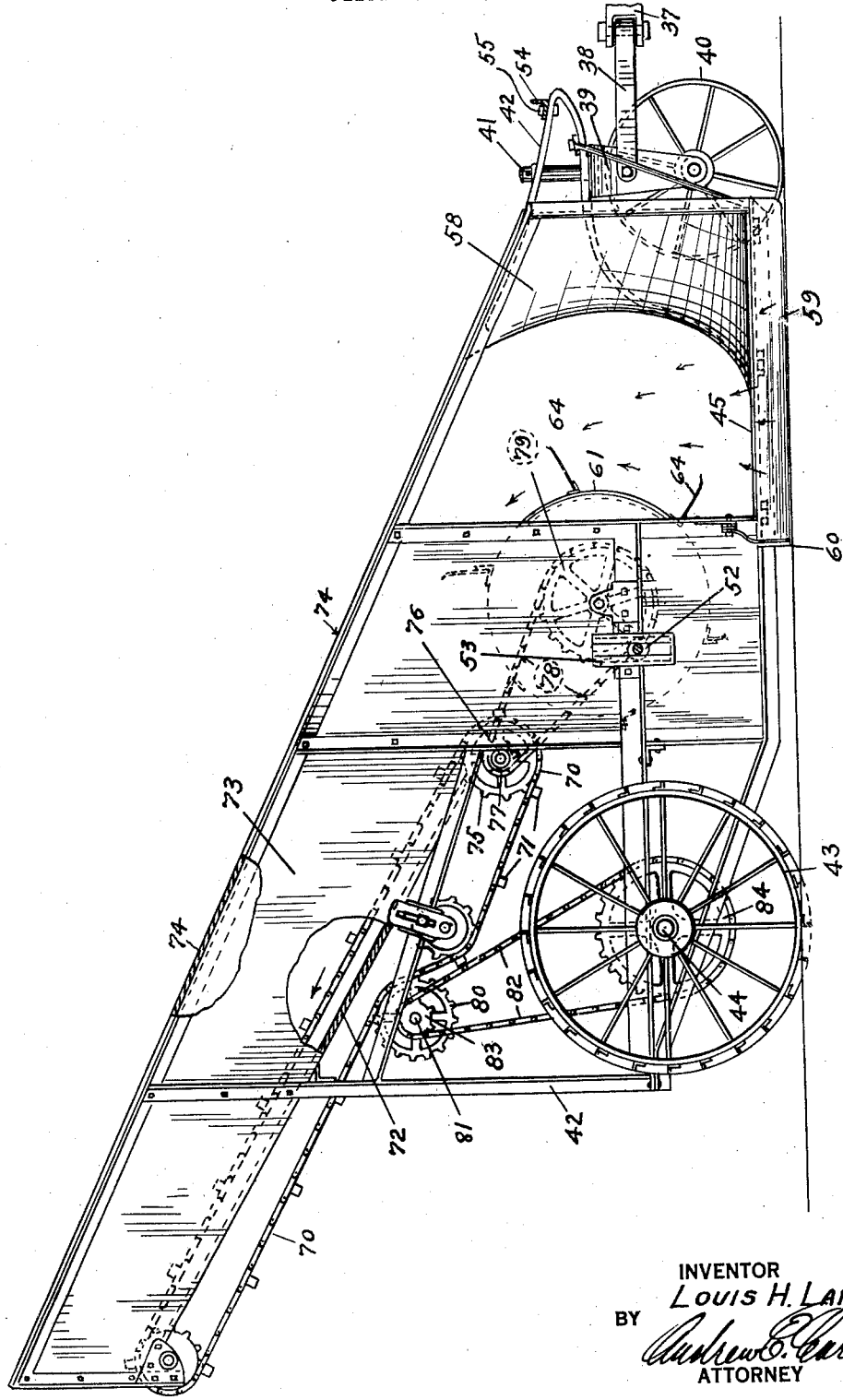

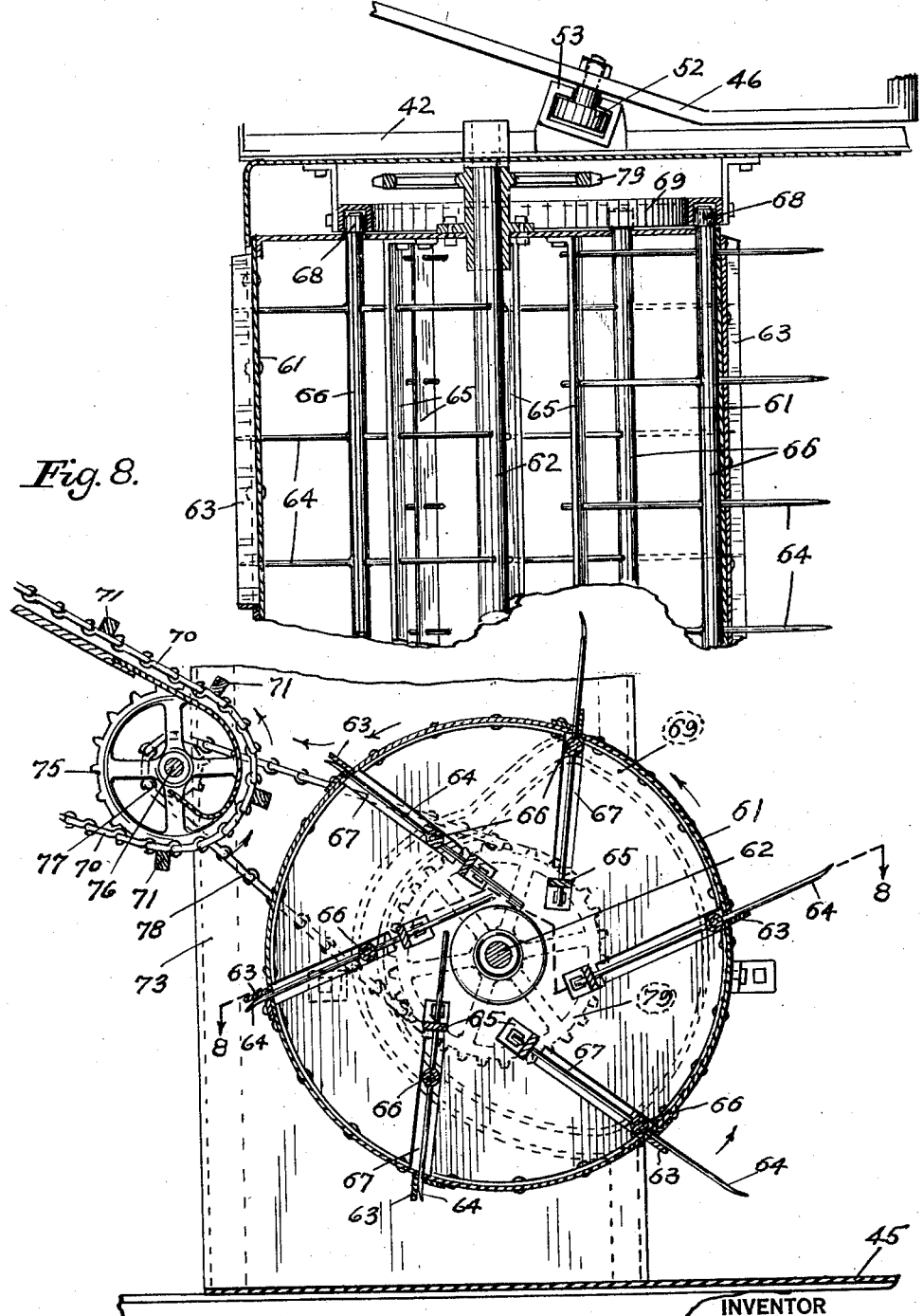

Sept. 20, 1932.   L. H. LARSON   1,877,770
TRACTOR PROPELLED RAKE AND LOADER
Filed Feb. 24, 1931   5 Sheets-Sheet 5
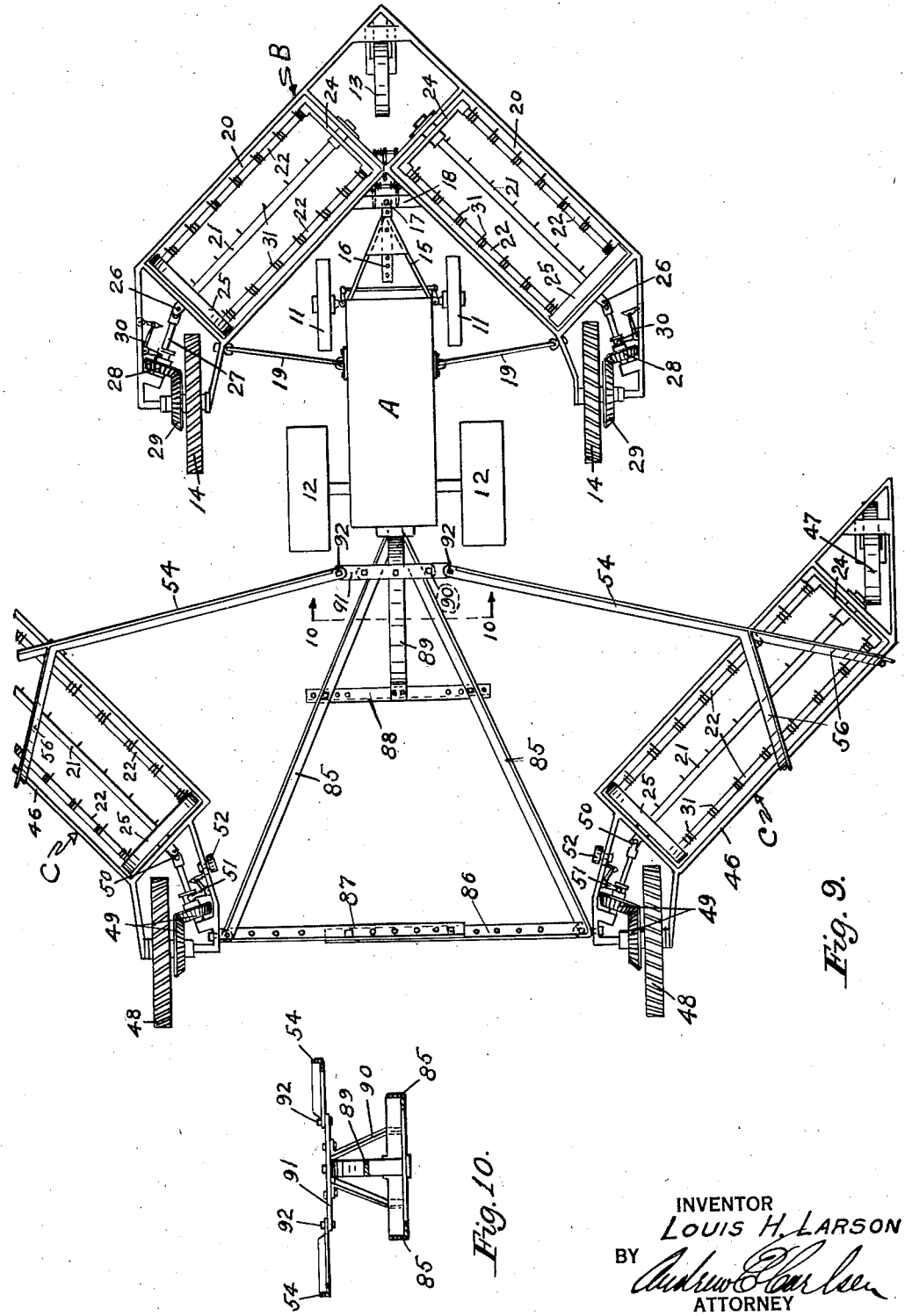

Patented Sept. 20, 1932

1,877,770

UNITED STATES PATENT OFFICE

LOUIS H. LARSON, OF SANTIAGO, MINNESOTA

TRACTOR PROPELLED RAKE AND LOADER

Application filed February 24, 1931. Serial No. 517,663.

This invention relates to crop handling machinery and the primary object is to provide a novel, efficient, and practical arrangement of devices in association with a tractor, that is particularly adaptable for the gathering in of hay or feed crops and then loading the same into vehicles such as hay racks drawn along behind the machine. More specifically the object is to provide a tractor propelled machine in which a pair of rake acting units are disposed in front of the tractor and operate to spread the crop to both sides to clear the way for the tractor, and a somewhat similar pair of units arranged rearwardly of the tractor to gather the crop back or inwardly to the loading unit. A further object is to provide an improved and highly efficient construction of loader unit. A further object is to provide means for connecting up said front and rear rake acting units with the tractor, and omitting the loader unit, whereby the machine may be employed for the sole purpose of raking up the crop and forming it into windrows on the field for further drying before being removed from the field. These and still other more specific objects will be disclosed in the course of the following specification, reference being had to the accompanying drawings, in which:

Fig. 6 is a side elevation of the loading unit with fractional portions broken away for purpose of illustration.

Fig. 7 is an enlarged sectional elevation as seen on the line 7—7 in Fig. 1.

Fig. 8 is a sectional detail view as seen on the irregular line 8—8 in Fig. 7.

Fig. 9 is a plan view similar to Fig. 1 but showing the loading unit removed and with the rear rake units in a rearranged position so that the entire machine is in condition for operation for windrowing purposes only.

Fig. 10 is a sectional detail view on the line 10—10 in Fig. 9.

Figure 1:
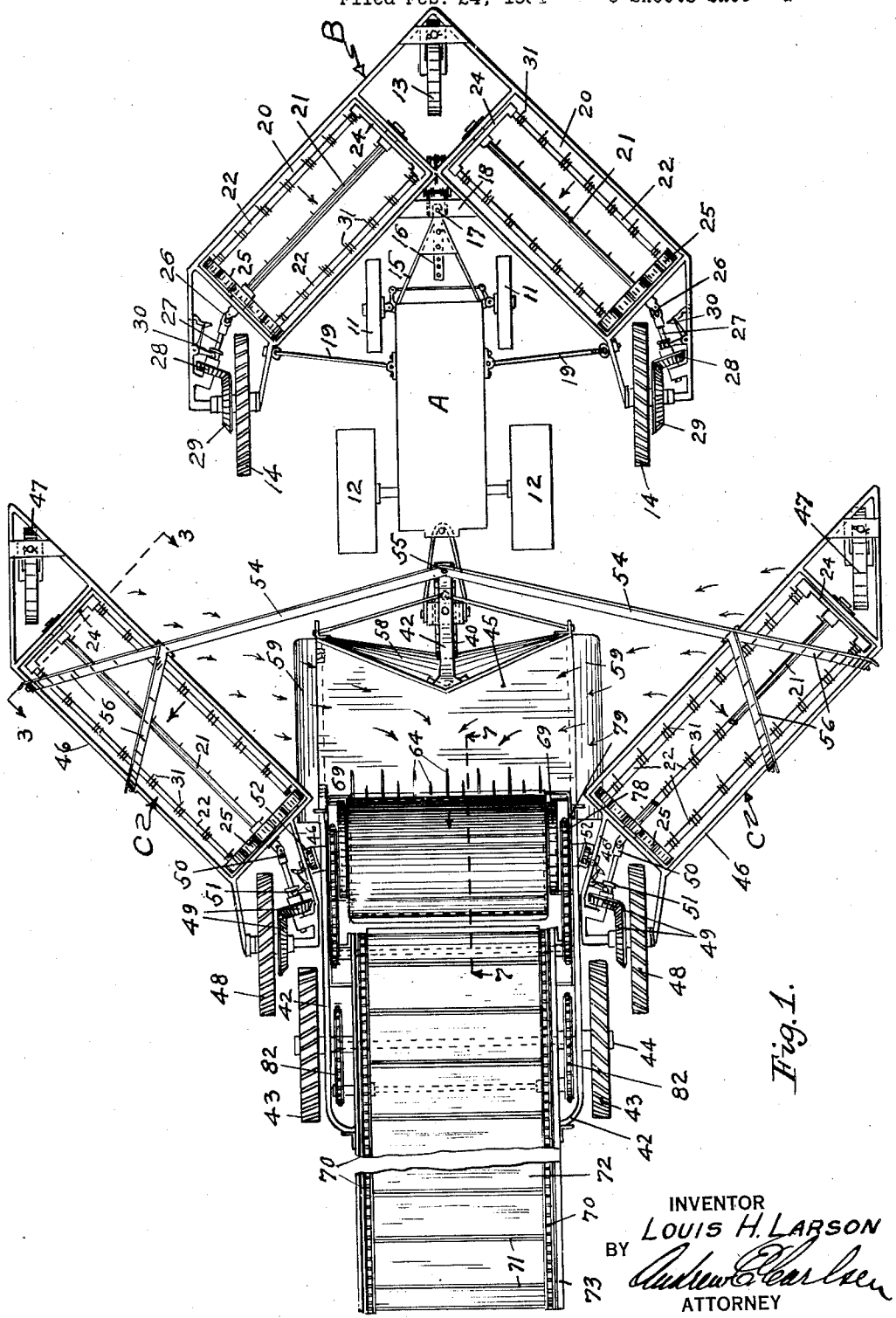
Fig. 1 is a plan view of the entire machine with a portion of the loading elevator broken out.

Referring to the drawings more particularly and by reference characters, A designates generally a tractor, the same having a fore- carriage 11 and traction wheels 12. The tractor may of course be of any suitable size or design and the one here illustrated is of standard construction and is represented in a conventional manner.

The crop handling unit at the front end of the tractor is shown in Figs. 1, 4, 5, and 9, and may be described as follows:

An angularly shaped steel frame B is arranged in advance of the tractor and is supported on a front castor wheel 13 and a pair of laterally disposed ground wheels 14. The frame B is connected to the tractor A by a reach 15 which is pivotally connected to the tractor and is provided at its front end with an adjustable bar 16 that is pivotally secured as at 17 to a brace 18 of the frame B. The frame B is also connected to the tractor A by a pair of tie bars 19 which permit of a floating action of the frame B with respect to the tractor.

From the foregoing it will be seen that the frame B will always rest on or be carried by the wheels 13 and 14 and will also be kept in a proper position in front of the tractor and be steered thereby through the connections 15—16 and 19, and the castor wheel 13 will of course be self-adjusting as the machine moves over the field.

The frame B provides a pair of laterally disposed rectangular openings 20 in which a pair of rake units operate. Each of these rake units or frames comprises a center shaft 21, three outer shafts 22, and a pair of spiders 24 and 25 connecting the outer shafts 22 and supporting them upon the center shaft 21. The shafts 21 are journaled in the frame B and are provided at their rear ends with universal joints 26 that connect them to short shafts 27 which are journaled in the rear ends of the frame B. Slidably keyed upon the shafts 27 are a pair of bevel pinions 28 which normally mesh with bevel gears 29 which are secured to and rotated by the ground wheels 14. A clutch lever 30 is arranged for connecting and disconnecting the pinions 28 and 29 so that the rake units will only be operated when needed.

Figure 3:
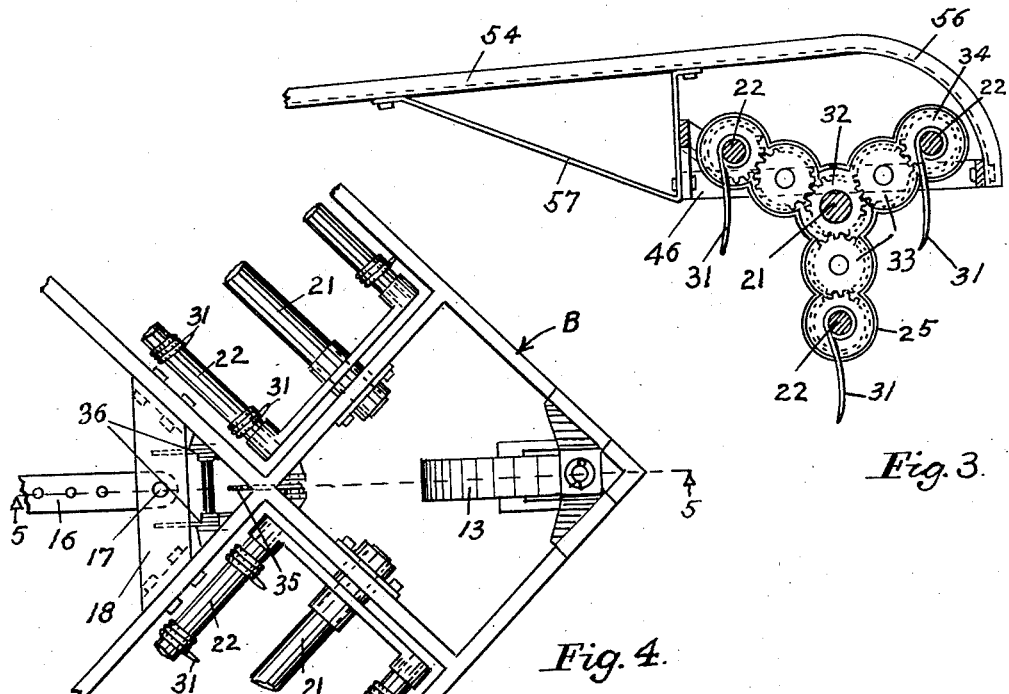
Fig. 3 is an enlarged detail sectional elevation on the line 3—3 in Fig. 1.
Figure 4:
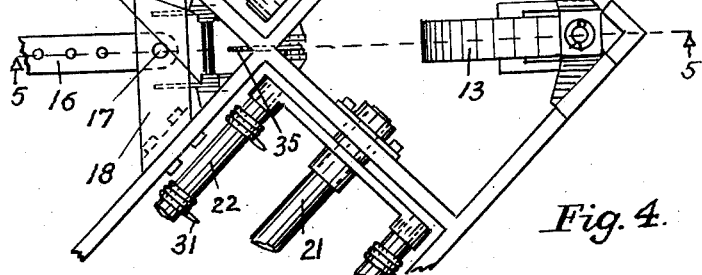
Fig. 4 is an enlarged detail plan view of the front end of the forward rake unit construction as shown in Fig. 1.
Figure 5:
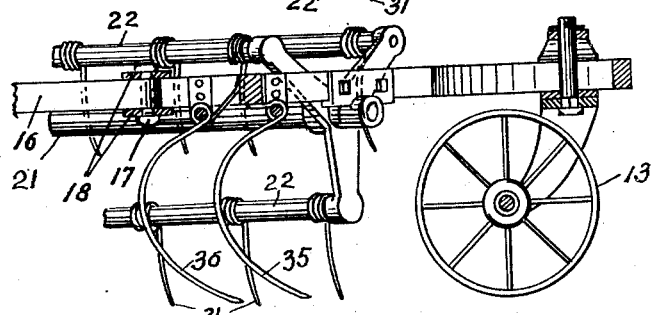
Fig. 5 is a sectional elevation on the line 5—5 in Fig. 4.

Each of the shafts or bars 22 of the respective rake units are provided with teeth or prongs 31 which are always kept in a downward or depending position through the action of a plurality of spur gears mounted in the spider frames 25. These spur gears, as shown in Fig. 3, are made up of a central stationary spur gear 32 which meshes with three spaced gears 33 which in turn mesh with gears 34 secured upon the forward ends of the shafts or bars 22. As the machine moves forwardly the ground wheels 14 will of course operate through the gears 29 and 28 and the shafts 27 and 21 so as to move the rake prongs 31 continuously outwardly at the bottom and consequently as the unit comes in contact with the crop lying on the ground the prongs 31 will continuously move or roll the crop outwardly so that it will gather in parallel rows at the opposite ends of the frame B. It may be noted with particular reference to Figs. 4 and 5 that the frame B is provided with three tines 35 and 36, arranged with the tine 35 forwardly and in the middle of the frame while the two tines 36 are disposed laterally and rearwardly with respect to the tine 35. The purpose of these tines is to prevent the machine from passing over any crop that might otherwise not be picked up by the rake frames, for as such crop comes in contact with the tines 35 and 36 they will tend to move it to either side sufficiently so that it will be picked up by the innermost prongs 31 of the respective rake frames.

The gathering and loading mechanism which is pulled behind the tractor may now be described as follows:

A loading machine, a side view of which is shown in Fig. 6, is attached to the draw bar 37 of the tractor as by a link 38 which is pivotally connected at its rear end to a forked yoke 39 of a steering wheel 40. The yoke 39 has a shank or spindle 41 that swivels in the main frame 42 of the loading machine. This loading machine is further supported by a pair of traction wheels 43 which are disposed one at each side of the machine and are secured upon the opposite ends of a shaft 44 journaled in the frame 42. At the forward end of the frame 42 is provided a platform 45 upon which the hay or other crop is moved by a pair of rake units generally designated by the letter C, and both of which are similar to the rake units above described as disposed in advance of the tractor, although they are arranged in a different manner and operate to move the crop inwardly upon the platform 45 rather than outwardly as is the case with the rake units in front of the tractor.

The rake units C are carried by frames 46 the outer ends of which are supported by castor wheels 47. The inner ends of the frames 46 are supported by ground wheels 48 which operate through bevel gears 49 and universal joints 50 to rotate the rake units C. Clutches 51 are also provided and serve to make or break driving connections between the respective rake units C and the ground wheels 48, in the same manner as previously described in connection with the clutches 30 of the forward rake units. The rake unit frames 46 are connected to the loader frame by headed studs 52 which are secured in but have freedom for vertical movement in brackets 53 secured to the sides of the frame 42 of the loader. Thus the rake frames 46 will have a floating action with respect to the loader and will follow the contour of the ground independently of the supporting wheels 43 of the loader. The frames 46 are also supported and braced by angle iron bars 54 which are connected at their inner ends by a bolt 55 to the frame 42 and are secured at their outer ends to the frames 46 by covered extensions 56 and braces 57, with a result that while the bars 54 will brace the frames 36 and prevent them from tipping or tilting, they will also securely hold them in place angularly with respect to the line of draft and will also keep them in operative positions with respect to the receiving platform 45 of the loader.

The front end of the loading machine immediately adjacent to the platform 45 is provided with a front wall or shield 58 to prevent the hay or other crop from being pushed forwardly and off of the platform. At its outer edges the platform is also provided with a pair of hinged side boards 59 which are preferably held down under the action of springs 60 so that the incoming crop will move smoothly over onto the platform 45 and not become caught on the outer edges thereof. As the hay crop is moved in upon the platform 45 from both sides of the machine it is immediately engaged by a pick-up mechanism which conveys it upwardly and rearwardly onto an endless conveyor which in turn operates to move the crop upwardly and rearwardly and then drop it into a vehicle drawn behind the loader.

The pick-up mechanism in question is shown in Figs. 1, 6, 7, and 8, and comprises a drum 61 which is mounted upon a shaft 62 journaled at its ends in the main frame 42 of the loader. The drum 61 is preferably formed of sheet metal and is provided at spaced intervals about its periphery with perforated angle bars 63, through which extend a plurality of lifting tines 64. Each series or group of these tines are also guided within the drum, in perforated guide bars 65. Between the guide bars 63 and 65 of each group the tines are rigidly secured in rods 66, the ends of which extend out through slots 67, in the end walls of the drum, and have end rollers 68 which travel and are guided in channeled cam members 69 so that as the drum 61 is rotated the tines 64 will be alternately projected from and withdrawn into the drum. The cams 69 are so designed (see dotted lines in Fig. 7) that the tines 64 will be in their projected or extended positions as they travel upwardly over the platform 45, but will be retracted as they travel downwardly with the rear face of the drum. In this manner the tines will operate to lift the hay crop from the platform 45 and carry it up and over to a point where it will be engaged and carried away by an endless conveyor made up of side chains 70 and cross bars 71. The upper run of this conveyor travels over a floor 72 and between side walls 73 and operates to take the hay crop from the drum 61 and carry it up and back to a point where it can be dropped into a vehicle drawn in a position under the rear end of the conveyor. It may also here be noted that it is preferable to provide the loader unit with a sheet metal cover plate 74, to serve as a guard and also to prevent the crop from being blown out or disturbed by the wind. This plate 74 is shown in Fig. 6, but has been omitted in Figs. 1 and 2.

The lower ends of the conveyor chains 70 pass over sprocket gears 75 on a shaft 76. This shaft is also provided, near its ends, with a pair of small sprocket pinions 77 which drive sprocket chains 78 that also pass over sprocket gears 79. These gears 79 are mounted on the drum shaft 62, and consequently the drum 61 will always operate in an anti-clockwise direction, as seen in Fig. 7, when the conveyor 70—71 is in operation.

The lower runs of the conveyor chains 70 pass over and are driven by sprocket gears 80 mounted on an idler shaft 81 suitably journaled in the main frame of the loader. The shaft 81 is in turn driven by a pair of chains 82 which pass over pinions 83 on the shaft 81 and over sprocket gears 84 on the shaft 44. The gears 84 are of course driven by the ground wheels 43, and as drive connections are preferably provided at both sides of the machine it is necessary to also provide a release clutch (not shown) at one side so that one wheel 48 may travel faster than the other, as when going around a curve or corner.

Figure 2:
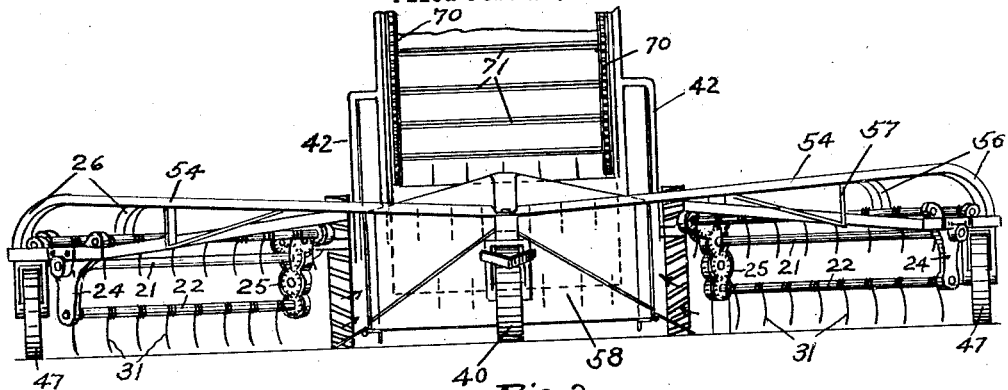
Fig. 2 is a front elevation of the gathering and loading mechanism that is pulled behind the tractor.

The operation of the machine as shown in Figs. 1 to 8 inclusive may be briefly described as follows:

With the various units in the positions indicated in Fig. 1, the tractor A operates to push the rake frame B and pulls the loader with its laterally disposed rake units C. With the clutches 30 and 51 all closed, the rake units are of course continuously operated by the action of the ground wheels 14 and 48. As the entire mechanism is moved over the field the angularly disposed rake units of the frame B engage the hay or other crop lying upon the field and move it outwardly to both sides where it gathers in the form of windrows parallel to the direction of travel. As the machine then progresses forwardly the rake units C gather in these windrows and also rake additional swath or strips, all of which is then caused to move inwardly toward the platform 45 due to the angle of the rake units C with respect to the line of draft.

As the crop is moved in over the side boards 59 and upon the platform 45 it is picked up by the tines 64 of the drum 61 and is carried upwardly and rearwardly to the point of engagement by the lower end of the conveyor 70—71, at which time the tines 64 are withdrawn into the drum under the action of the two cam members 69, and which action eliminates any possibility of the crop following around with the drum. As the material is picked up by the conveyor 70—71 it is moved upwardly and rearwardly over the floor 72 until it reaches the upper end of the conveyor, at which point it is dropped into the hay rack or other wheeled container that may be drawn along with the machine.

In the structure as shown in Figs. 9 and 10, the loader shown in Fig. 1 has been eliminated and substituted by a triangular frame consisting of converging side bars 85, the forward ends of which are connected directly to the draw bar of the tractor, and the rear ends of which are connected by an angle iron cross beam 86, the same consisting of two sections which are adjustably secured together as by bolts 87 so that the length of the beam can be varied at will. As the inner ends of the brace bars 54 of the rake units C must be maintained at a level somewhat higher than the normal height of the tractor draw bar I have provided the frame 85—86 with additional brackets in the way of a cross piece 88, an angular brace 89, a cross brace 90, and a head member 91 carried by the brace unit 89—90, and to which head member the brace rods 54 are connected as at 92.

The rake mechanism as shown in Fig. 9 is designed for windrowing purposes only and for that reason the rake units C are disposed farther apart than as shown in Fig. 1, and thus will accommodate a considerably wider strip of land than is the case with the loader arrangement. As the machine shown in Fig. 9 is driven over the field the forward rake units function in exactly the same manner as previously described in connection with Fig. 1. The rearward rake units C also function in a similar manner but are primarily intended to add a considerable quantity of crop to the windrow formed by the forward rake units, with a result that the machine leaves a pair of parallel crop windrows on the field and spaced apart according to the distance between the inner ends of the rake units C.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. The combination with a tractor, of primary rake acting means propelled by the tractor for clearing a path therefor, secondary rake acting means disposed rearwardly of and drawn by the tractor for moving the previously raked crop inwardly, and a loading mechanism aranged to receive crop from the said secondary rake acting means.

2. A crop gathering and loading mechanism comprising a tractor, a rake unit arranged in advance of the tractor for clearing a path therefor, means drawn by the tractor for gathering in the crop previously acted upon by the rake unit, and a loader mechanism associated with the gathering means.

3. A crop gathering and loading mechanism comprising a tractor, a rake unit arranged in advance of the tractor for clearing a path therefor, means drawn by the tractor for gathering in the crop previously acted upon by the rake unit, and a loader mechanism associated with the gathering means, said rake unit including a frame arranged in front of and secured to the tractor, power driven rakes carried by the frame, and laterally disposed wheel supports at the outer ends of the frame.

4. A rake mechanism for a tractor comprising a frame disposed in front of the tractor and connected therewith so as to be propelled thereby, a pair of rotatable rake units carried by the frame, one at each side of the median line of the tractor and with their axes converging forwardly.

5. A rake mechanism for a tractor comprising a frame disposed in front of the tractor and connected therewith so as to be propelled thereby, a pair of rotatable rake units carried by the frame, one at each side of the median line of the tractor and with their axes converging forwardly and disposed obliquely with respect to said median line, and power means for rotating said rake units.

6. A rake mechanism for a tractor comprising a frame disposed in front of the tractor and connected therewith so as to be propelled thereby, a pair of rotatable forwardly converging rake units carried by the frame, one at each side of the median line of the tractor and with their respective axes disposed obliquely with respect to said median line, a ground wheel supporting the forward end of the frame, and means for actuating the rake units.

7. A rake mechanism for a tractor comprising a frame disposed in front of the tractor and connected therewith so as to be propelled thereby, a pair of rotatable forwardly converging rake units carried by the frame, one at each side of the median line of the tractor and ground engaging means, independent of the tractor, for supporting the frame.

8. A raking attachment for a tractor comprising a frame extending in front and to both sides of the tractor, a pair of forwardly converging rotatable rake units carried by the frame, and means disposed between the front ends of said rake units to prevent the passage of crop material therebetween.

9. A raking attachment for a tractor comprising a frame extending in front and to sides of the tractor, a pair of forwardly converging rotatable rake units carried by the frame, wheels, independent of the tractor, forming ground supports for the frame, and drive connections between said wheels and said rake units.

10. The combination including a tractor, four windrow forming rake units connected with the tractor so as to be propelled thereby, two of said rake units being disposed in front of the tractor to move the crop outwardly with respect to the path of travel, and the other two rake units being arranged back of the tractor and outwardly of the paths of travel of the front rake units to effect an inward raking action upon crop material lying on the field.

11. The combination including a tractor, four rake units connected with the tractor so as to be propelled thereby, two of said rake units being disposed in front of the tractor to move the crop outwardly with respect to the path of travel, and the other two rake units being arranged back of the tractor to effect an inward raking action upon crop material lying on the field, said second mentioned rake units being substantially spaced apart so as to define a path of travel considerably greater than that defined by the first mentioned rake units.

12. The combination including a tractor, four rake units connected with the tractor so as to be propelled thereby, two of said rake units being disposed in front of the tractor to move the crop outwardly with respect to the path of travel, and the other two rake units being arranged back of the tractor to effect an inward raking action upon crop material lying on the field, said second mentioned rake units being substantially spaced apart so as to define a path of travel considerably greater than that defined by the first mentioned rake units, and a loading machine arranged to receive crop material from the rearwardly arranged rake units.

13. A gathering and loading machine comprising a wheel supported main frame having a crop receiving platform at its forward end, a pair of gathering devices, one at each side of the platform, for gathering a crop as the machine moves forwardly and moving it upon the platform, and a conveyor for moving the crop upwardly and rearwardly from the platform.

14. A gathering and loading machine comprising a wheel supported main frame having a crop receiving platform at its forward end, a pair of gathering devices, one at each side of the platform, for gathering a crop as the machine moves forwardly and moving it upon the platform, a conveyor arranged rearwardly of the platform, and a crop lifting mechanism disposed between the conveyor and platform.

15. A gathering and loading machine comprising a wheel supported main frame having a crop receiving platform at its forward end, a pair of gathering devices, one at each side of the platform, for gathering a crop as the machine moves forwardly and moving it upon the platform, a conveyor arranged rearwardly of the platform, and a crop lifting mechanism disposed between the conveyor and platform, said lifting mechanism comprising a rotatable member having projectable crop engaging tines, and means for projecting and retracting the tines as the member is rotated.

16. A gathering and loading machine comprising a wheel supported main frame having a crop receiving platform at its forward end, a pair of gathering devices, one at each side of the platform, for gathering a crop as the machine moves forwardly and moving it upon the platform, a conveyor arranged rearwardly of the platform, a rotatable drum disposed between the conveyor and platform, projectable tines carried by the drum for lifting the crop from the platform to the conveyor, and cam means for projecting and retracting the tines at predetermined intervals as the drum rotates.

17. A windrowing machine comprising a tractor and two pairs of rake units for attachment to the tractor, one pair in advance of the tractor for raking the field outwardly with respect to the path of travel, and the other pair of rake units being arranged rearwardly of the tractor and spaced outwardly of the path of travel of the tractor to rake the field inwardly, whereby the rake units at each side of the machine will operate to gather two strips of crop and form them into a single windrow.

18. A windrowing machine comprising a tractor and two pairs of rake units for attachment to the tractor, one pair in advance of the tractor for raking the field outwardly with respect to the path of travel, and the other pair of rake units being arranged rearwardly of the tractor and spaced outwardly of the path of travel of the tractor to rake the field inwardly, whereby the rake units at each side of the machine will operate to gather two strips of crop and form them into a single windrow, and draft frame connections between the tractor and said rear rake units having provision for adjustment to effect lateral adjustments to the rake units.

Signed at Minneapolis, in the county of Hennepin and State of Minnesota, this 20th day of February, 1931.

LOUIS H. LARSON.